United States Patent
Yang

(10) Patent No.: US 8,494,046 B2
(45) Date of Patent: Jul. 23, 2013

(54) METHOD AND AN APPARATUS FOR DECODING/ENCODING A VIDEO SIGNAL BY PERFORMING ILLUMINATION COMPENSATION

(75) Inventor: Jeong Hyu Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 944 days.

(21) Appl. No.: 12/450,340

(22) PCT Filed: Mar. 24, 2008

(86) PCT No.: PCT/KR2008/001631
§ 371 (c)(1),
(2), (4) Date: Sep. 22, 2009

(87) PCT Pub. No.: WO2008/117963
PCT Pub. Date: Oct. 2, 2008

(65) Prior Publication Data
US 2010/0098157 A1    Apr. 22, 2010

Related U.S. Application Data

(60) Provisional application No. 60/896,638, filed on Mar. 23, 2007, provisional application No. 60/929,220, filed on Jun. 18, 2007, provisional application No. 60/947,648, filed on Jul. 2, 2007, provisional application No. 60/979,868, filed on Oct. 15, 2007.

(51) Int. Cl.
*H04N 7/12*    (2006.01)

(52) U.S. Cl.
USPC ................................. 375/240.02; 375/240.24

(58) Field of Classification Search
None
See application file for complete search history.

(56) References Cited

U.S. PATENT DOCUMENTS

| 2005/0195317 A1 | 9/2005 | Myoga |
| 2006/0133501 A1 | 6/2006 | Lee et al. |
| 2007/0177674 A1* | 8/2007 | Yang ........................ 375/240.25 |
| 2007/0177811 A1* | 8/2007 | Yang ............................ 382/233 |
| 2008/0130750 A1* | 6/2008 | Song ........................ 375/240.16 |

(Continued)

FOREIGN PATENT DOCUMENTS
WO    WO 2005/020584    3/2005

OTHER PUBLICATIONS

Search Report for corresponding European Application No. 08723667 dated Feb. 1, 2011.

(Continued)

*Primary Examiner* — Donald Mills
(74) *Attorney, Agent, or Firm* — Harness, Dickey & Pierce, P.L.C.

(57) ABSTRACT

A method for recovering transmission errors, comprising: receiving a data packet comprising an error detection code associated to data contained in the packet, wherein the data associated to the error detection code comprises primary data and secondary data, checking the error detection code of the received packet to detect an erroneous state of the associated data, when the erroneous state is detected, determining a finite set of candidate values for the primary data and, for each values of the set: determining a marginal likelihood of the candidate value as a function of the error detection code of the received packet, determining a first correlation between the primary data of the received packet and the candidate value, and selecting a corrected value for the primary data among the set of candidate values as a function of said marginal likelihoods and said first correlations.

8 Claims, 18 Drawing Sheets

U.S. PATENT DOCUMENTS

| | | | |
|---|---|---|---|
| 2008/0144722 A1* | 6/2008 | Park et al. ............... | 375/240.25 |
| 2008/0170629 A1* | 7/2008 | Shim et al. ............... | 375/240.29 |
| 2009/0168874 A1* | 7/2009 | Su et al. .................. | 375/240.12 |
| 2010/0091844 A1* | 4/2010 | Jeon et al. ............... | 375/240.12 |
| 2010/0183068 A1* | 7/2010 | Pandit et al. ............ | 375/240.02 |
| 2010/0232507 A1* | 9/2010 | Cho et al. ................ | 375/240.16 |

OTHER PUBLICATIONS

Lee et al., "CE11: Illumination compensation," ITU Study Group 16—Video Conding Experts Group—ISO/IEC MPEG&ITU-T VCEG (ISO/IEC JTC1/SC29/WG11 and ITU-T SG16 Q6), No. JVT-U052, Oct. 26, 2006, XP030006698.

Lee et al., "Results of CE2 on Multi-view Video Coding," 77. MPEG Meeting, Jul. 17-21, 2006, Klagenfurt; (Motion Picture Expert Group or ISO/IEC JTC1/SC29/VJG11), No. M13498, Jul. 12, 2006, XP030042167.

Park et al., Simplif B and P-SKIP modes on MVC ILLUM COMP, 25. JVT Meeting; 82. MPEG Meeting; Oct. 21-26, 2007; Shenzhen, CN; (Joint Video Team of ISO/IEC JTC1/SC29/WG11 and ITU-T SG16), No. JVT-Y033, Oct. 20, 2007, XP030007238.

Jeong-Hyu Yang, "CE09: Derivation of MVC IC Information," Document: JVT-V063, [online], Jan. 16, 2007, Join Video Team (JVT) of ISO/IEC MPEG & ITU-T VCEG (ISO/IEC JTC1/SC29/WG11 and ITU-T SG16 Q.6), <URL: http://wftp3.itu.int/av-arch/jvt-site/2007_01_Marrakech/JVT-V063.zip>.

PowerPoint of Jeong-Hyu Yang, "CE09: Derivation of MVC IC Information," Document: JVT-V063, [online], Jan. 16, 2007, Join Video Team (JVT) of ISO/IEC MPEG & ITU-T VCEG (ISO/IEC JTC1/SC29/WG11 and ITU-T SG16Q.6), <URL: http://wftp3.itu.int/av-arch/jvt-site/2007_01_Marrakech/JVT-V063.zip>.

wftp.itu.int-/av-arch/jvt-site/2007_01_Marrakech/ [online], <URL: http://wftp3.itu.int/av-arch/jvt-site/2007_01_Marrakech>.

wftp.itu.int-/av-arch/jvt-site/2006_01_Hangzhou/, [online], <URL: http://wftp3.itu.int/av-arch/jvt-site/2006_01_Hangzhou>.

International Search Report.

Antony Vetro et al., Joint Multiview Video Model (JMVM) 2.0, Documents: JVT-U207, Joint Video Team of ISO/IEC MPEG & IU-T VCEG (ISO/IEC JTC1/SC29/WG11 and ITU-T SG16 Q.6), Nov. 14, 2006, URL, http://wftp3.itu.int/av-arch/jvt-site/2006_10_Hangzhou/JVT-U207.zip.

* cited by examiner $IC\_offset = M_{cur} - M_{ref}$

FIG. 7

| camera_arrangement_info( payloadSize ) { | C | Descriptor |
|---|---|---|
|    linear_configuration_flag | 5 | u(1) |
|    max_num_view_ver_minus1 | 5 | ue(v) |
|    max_num_view_hor_minus1 | 5 | ue(v) |
|    for( i=0; i<= max_num_view_ver_minus1; i++ ) { | | |
|      for( j=0; j<= max_num_view_hor_minus1; j++ ) { | | |
|        camera_present_flag[i][j] | 5 | u(1) |
|        if( camera_present_flag[i][j] ) | | |
|          view_id[i][j] | 5 | ue(v) |
|      } | | |
|    } | | |
| } | | |

FIG. 8

| camera_arrangement_info( payloadSize ) { | C | Descriptor |
|---|---|---|
|    linear_configuration_flag | 5 | u(1) |
|    max_num_view_ver_minus1 | 5 | ue(v) |
|    max_num_view_hor_minus1 | 5 | ue(v) |
|    if(max_num_view_ver_minus1 == 0 ) { | | |
|       for( j=0; j<= max_num_view_hor_minus1; j++ ) | | |
|          view_id[0][j] | 5 | ue(v) |
|    } | | |
|    else { | 5 | |
|       for( i=0; i<= max_num_view_ver_minus1; i++ ) { | | |
|          for( j=0; j<= max_num_view_hor_minus1; j++ ) { | | |
|             camera_present_flag[i][j] | 5 | u(1) |
|             if( camera_present_flag[i][j] ) | | |
|                view_id[i][j] | 5 | ue(v) |
|          } | | |
|       } | | |
|    } | | |
| } | | |

FIG. 9

| camera_arrangement_info( payloadSize ) { | C | Descriptor |
|---|---|---|
|    linear_configuration_flag | 5 | u(1) |
|    one_dimension_flag | 5 | u(1) |
|    if( one_dimension_flag == 0 ) { | | |
|      max_num_view_ver_minus1 | 5 | ue(v) |
|      for( i=0; i<=max_num_view_ver_minus1; i++ ) { | | |
|        num_view_hor_minus1[i] | 5 | ue(v) |
|        for( j=0; j<=num_view_hor_minus1[i]; j++ ) | | |
|          view_id[i][j] | 5 | ue(v) |
|      } | | |
|    } | | |
|    else { | | |
|      max_num_view_hor_minus1 | 5 | ue(v) |
|      for( j=0; j<=max_num_view_hor_minus1; j++ ) | | |
|        view_id[0][j] | 5 | ue(v) |

FIG. 10

| camera_arrangement_info( payloadSize ) { | C | Descriptor |
|---|---|---|
|   linear_configuration_flag | 5 | u(1) |
|   max_num_view_ver_minus1 | 5 | ue(v) |
|   max_num_view_hor_minus1 | 5 | ue(v) |
|   one_dimension_flag | 5 | u(1) |
|   for( i=0; i<= max_num_view_ver_minus1; i++ ) { | | |
|     for( j=0; j<= max_num_view_hor_minus1; j++ ) { | | |
|       if( one_dimension_flag == 0 ) | | |
|         camera_present_flag[i][j] | 5 | u(1) |
|       else camera_present_flag[i][j] = 1 | | |
|       if( camera_present_flag[i][j] ) | | |
|         view_id[i][j] | 5 | ue(v) |
|     } | | |
|   } | | |
| } | | |

FIG. 11

| camera_arrangement_info( payloadSize ) { | C | Descriptor |
|---|---|---|
|    linear_configuration_flag | 5 | u(1) |
|    max_num_view_hor_minus1 | 5 | ue(v) |
|    one_dimension_flag | 5 | u(1) |
|    if( one_dimension_flag == 1 ) { | | |
|       for( j=0; j<= max_num_view_hor_minus1; j++ ) | | |
|          view_id[0][j] | 5 | ue(v) |
|    } | | |
|    else { | 5 | |
|       max_num_view_ver_minus1 | 5 | ue(v) |
|       for( i=0; i<= max_num_view_ver_minus1; i++ ) { | | |
|          for( j=0; j<= max_num_view_hor_minus1; j++ ) { | | |
|             camera_present_flag[i][j] | 5 | u(1) |
|             if( camera_present_flag[i][j] ) | | |
|                view_id[i][j] | 5 | ue(v) |
|          } | | |
|       } | | |
|    } | | |
| } | | |

FIG. 12

| camera_arrangement_info( payloadSize ) { | C | Descriptor |
|---|---|---|
|     linear_configuration_flag | 5 | u(1) |
|     max_num_view_ver_minus1 | 5 | ue(v) |
|     regular_two_dimension_flag | | u(1) |
|     if( regular_two_dimension_flag == 0 ) { | 5 | |
|       for( i=0; i<= max_num_view_ver_minus1; i++ ) { | 5 | |
|         num_view_hor_minus1[i] | 5 | ue(v) |
|         for( j=0; j<=num_view_hor_minus1[i]; j++ ) | | |
|           view_id[i][j] | | ue(v) |
|       } | | |
|     } | | |
|     else { | | |
|       max_num_view_hor_minus1 | 5 | ue(v) |
|       for( i=0; i<= max_num_view_ver_minus1; i++ ) | | |
|         for( j=0; j<= max_num_view_hor_minus1; j++ ) | | |
|           view_id[i][j] | 5 | ue(v) |
|       } | | |
|     } | | |

FIG. 13

| camera_arrangement_info( payloadSize ) { | C | Descriptor |
|---|---|---|
|    linear_configuration_flag | 5 | u(1) |
|    max_num_view_ver_minus1 | 5 | ue(v) |
|    max_num_view_hor_minus1 | 5 | ue(v) |
|    regular_two_dimension_flag | 5 | u(1) |
|    if( regular_two_dimension_flag == 0 ) { | | |
|      for( i=0; i<= max_num_view_ver_minus1; i++ ) { | | |
|         for( j=0; j<= max_num_view_hor_minus1; j++ ) { | | |
|            camera_present_flag[i][j] | 5 | u(1) |
|            if( camera_present_flag[i][j] ) | | |
|               view_id[i][j] | 5 | ue(v) |
|         } | | |
|      } | | |
|    } | | |
|    else { | | |
|      for( i=0; i<=max_num_view_ver_minus1; i++ ) | | |
|         for( j=0; j<= max_num_view_hor_minus1; j++ ) | | |
|            view_id[i][j] | 5 | ue(v) |
|    } | | |
| } | | |

FIG. 14

| camera_arrangement_info( payloadSize ) { | C | Descriptor |
|---|---|---|
|     linear_configuration_flag | 5 | u(1) |
|     one_dimension_flag | 5 | u(1) |
|     if( one_dimension_flag == 0 ) { | | |
|         regular_two_dimension_flag | 5 | u(1) |
|         max_num_view_ver_minus1 | 5 | ue(v) |
|     } | | |
|     else { | | |
|         regular_two_dimension_flag = 0 | | |
|         max_num_view_ver_minus1 = 0 | | |
|     } | | |
|     if( regular_two_dimension_flag == 0 ) | | |
|         for( i=0; i<=max_num_view_ver_minus1; i++ ) { | | |
|             num_view_hor_minus1[i] | 5 | ue(v) |
|             for( j=0; j<=num_view_hor_minus1[i]; j++ ) | | |
|                 view_id[i][j] | 5 | ue(v) |
|         } | | |
|     else { | | |
|         max_num_view_hor_minus1 | 5 | ue(v) |
|         for( i=0; i<=max_num_view_ver_minus1; i++ ) | | |
|             for( j=0; j<= max_num_view_hor_minus1; j++ ) | | |
|                 view_id[i][j] | 5 | ue(v) |
|     } | | |
| } | | |

FIG. 16

| seq_parameter_set_mvc_extension( ) { | C | Descriptor |
|---|---|---|
| num_views_minus_1 | | ue(v) |
| for(i = 0; i <= num_views_minus_1; i++) | | |
| view_id[i] | | ue(v) |
| S1610 — for(i = 1; i <= num_views_minus_1; i++) { | | |
| S1620 — num_anchor_refs_l0[i] | | ue(v) |
| for( j = 0; j < num_anchor_refs_l0[i]; j++ ) | | |
| anchor_ref_l0[i][j] | | ue(v) |
| S1630 — num_anchor_refs_l1[i] | | ue(v) |
| for( j = 0; j < num_anchor_refs_l1[i]; j++ ) | | |
| anchor_ref_l1[i][j] | | ue(v) |
| } | | |
| S1640 — for(i = 1; i <= num_views_minus_1; i++) { | | |
| S1650 — num_non_anchor_refs_l0[i] | | ue(v) |
| for( j = 0; j < num_non_anchor_refs_l0[i]; j++ ) | | |
| non_anchor_ref_l0[i][j] | | ue(v) |
| S1660 — num_non_anchor_refs_l1[i] | | ue(v) |
| for( j = 0; j < num_non_anchor_refs_l1[i]; j++ ) | | |
| non_anchor_ref_l1[i][j] | | ue(v) |
| } | | |
| } | | |

FIG. 17

| seq_parameter_set_mvc_extension( ) { | C | Descriptor |
|---|---|---|
| num_views_minus_1 | | ue(v) |
| for( i = 0; i <= num_views_minus_1; i++ ) | | |
| view_id[i] | | ue(v) |
| for( i = 1; i <= num_views_minus_1; i++ ) { | | |
| num_non_anchor_refs_l0[i] | | ue(v) |
| for( j = 0; j < num_non_anchor_refs_l0[i]; j++ ) | | |
| non_anchor_ref_l0[i][j] | | ue(v) |
| num_non_anchor_refs_l1[i] | | ue(v) |
| for( j = 0; j < num_anchor_refs_l1[i]; j++ ) | | |
| non_anchor_ref_l1[i][j] | | ue(v) |
| } | | |
| for( i = 1; i <= num_views_minus_1; i++ ) { | | |
| num_anchor_refs_l0[i] | | ue(v) |
| for( j = 0; j < num_non_anchor_refs_l0[i]; j++ ) | | |
| anchor_ref_l0[i][j] = non_anchor_ref_l0[i][j] | | |
| for( j = num_non_anchor_refs_l0[i]; j < num_anchor_refs_l0[i]; j++ ) | | |
| anchor_ref_l0[i][j] | | ue(v) |
| num_anchor_refs_l1[i] | | ue(v) |
| for( j = 0; j < num_non_anchor_refs_l1[i]; j++ ) | | |
| anchor_ref_l1[i][j] = non_anchor_ref_l1[i][j] | | |
| for( j = num_non_anchor_refs_l1[i]; j < num_anchor_refs_l1[i]; j++ ) | | |
| anchor_ref_l1[i][j] | | ue(v) |
| } | | |
| } | | |

S1710: num_non_anchor_refs block
S1720, S1730: anchor_ref_l0 blocks
S1740, S1750: anchor_ref_l1 blocks

FIG. 18

| seq_parameter_set_mvc_extension( ) { | C | Descriptor |
|---|---|---|
| num_views_minus_1 | | ue(v) |
| for(i = 0; i <= num_views_minus_1; i++) | | |
| view_id[i] | | ue(v) |
| for(i = 1; i <= num_views_minus_1; i++) { | | |
| num_non_anchor_refs_l0[i] | | ue(v) |
| for( j = 0; j < num_non_anchor_refs_l0[i]; j++ ) | | |
| non_anchor_ref_l0[i][j] | | ue(v) |
| num_non_anchor_refs_l1[i] | | ue(v) |
| for( j = 0; j < num_anchor_refs_l1[i]; j++ ) | | |
| non_anchor_ref_l1[i][j] | | ue(v) |
| } | | |
| for(i = 1; i <= num_views_minus_1; i++) { | | |
| num_diff_anchor_non_anchor_refs_l0[i] | | ue(v) |
| num_anchor_refs_l0[i] = num_non_anchor_refs_l0[i] + num_diff_anchor_non_anchor_refs_l0[i] | | |
| for( j = 0; j < num_non_anchor_refs_l0[i]; j++ ) | | |
| anchor_ref_l0[i][j] = non_anchor_ref_l0[i][j] | | |
| for( j = num_non_anchor_refs_l0[i]; j < num_anchor_refs_l0[i]; j++ ) | | |
| anchor_ref_l0[i][j] | | ue(v) |
| num_diff_anchor_non_anchor_refs_l1[i] | | ue(v) |
| num_anchor_refs_l1[i] = num_non_anchor_refs_l1[i] + num_diff_anchor_non_anchor_refs_l1[i] | | |
| for( j =0; j < num_non_anchor_refs_l1[i]; j++ ) | | |
| anchor_ref_l1[i][j] = non_anchor_ref_l1[i][j] | | |
| for( j = num_non_anchor_refs_l1[i]; j < num_anchor_refs_l1[i]; j++ ) | | |
| anchor_ref_l1[i][j] | | ue(v) |
| } | | |
| } | | |

S1810 — num_diff_anchor_non_anchor_refs_l0[i]
S1820 — anchor_ref_l0 block
S1830 — num_diff_anchor_non_anchor_refs_l1[i]
S1840 — anchor_ref_l1 block

FIG. 19

| seq_parameter_set_mvc_extension( ) { | C | Descriptor |
|---|---|---|
| num_views_minus_1 | | ue(v) |
| for(i = 0; i <= num_views_minus_1; i++) | | |
| view_id[i] | | ue(v) |
| for(i = 0; i <= num_views_minus_1; i++) { | | |
| num_anchor_refs_l0[i] | | ue(v) |
| num_anchor_refs_l1[i] | | ue(v) |
| num_non_anchor_refs_l0[i] | | ue(v) |
| num_non_anchor_refs_l1[i] | | ue(v) |
| for( j=0; j<max(num_anchor_refs_l0[i], num_non_anchor_refs_l0[i]); j++ ) | | |
| multiview_ref_l0[i][j] | | ue(v) |
| for( j=0; j<max(num_anchor_refs_l1[i], num_non_anchor_refs_l1[i]); j++ ) | | |
| multiview_ref_l1[i][j] | | ue(v) |
| } | | |
| } | | |

S1910 → for( j=0; j<max(num_anchor_refs_l0[i], num_non_anchor_refs_l0[i]); j++ )
S1920 → multiview_ref_l0[i][j]
S1930 → for( j=0; j<max(num_anchor_refs_l1[i], num_non_anchor_refs_l1[i]); j++ )
S1940 → multiview_ref_l1[i][j]

FIG. 20

| seq_parameter_set_mvc_extension( ) { | C | Descriptor |
|---|---|---|
| num_views_minus_1 | | ue(v) |
| for(i = 0; i <= num_views_minus_1; i++) | | |
| view_id[i] | | ue(v) |
| for(i = 1; i <= num_views_minus_1; i++) { | | |
| num_anchor_refs_l0[i] | | ue(v) |
| num_anchor_refs_l1[i] | | ue(v) |
| num_non_anchor_refs_l0[i] | | ue(v) |
| num_non_anchor_refs_l1[i] | | ue(v) |
| for( j=0; j<max(num_anchor_refs_l0[i], num_non_anchor_refs_l0[i]); j++ ) | | |
| multiview_ref_l0[i][j] | | ue(v) |
| for( j=0; j<max(num_anchor_refs_l1[i], num_non_anchor_refs_l1[i]); j++ ) | | |
| multiview_ref_l1[i][j] | | ue(v) |
| } | | |
| } | | |

S2010 points to the row: for(i = 1; i <= num_views_minus_1; i++) {

METHOD AND AN APPARATUS FOR DECODING/ENCODING A VIDEO SIGNAL BY PERFORMING ILLUMINATION COMPENSATION

This application is a National Phase entry of PCT Application number PCT/KR2008/001631 filed on Mar. 24, 2008, which claims priority under 35 U.S.C. §§119(e), 120 and 365(c) to U.S. Provisional Application Nos. 60/896,638, 60/929,220, 60/947,648 and 60/979,868 filed on Mar. 23, 2007, Jun. 18, 2007, Jul. 2, 2007 and Oct. 15, 2007, respectively.

TECHNICAL FIELD

The present invention relates to coding of a video signal.

BACKGROUND ART

Compression coding means a series of signal processing techniques for transmitting digitalized information via a communication circuit or storing the digitalized information in a form suitable for a storage medium. As targets of compression coding, there are audio, video, characters, etc. In particular, a technique for performing compression coding on video is called video sequence compression. A video sequence is generally characterized in having spatial redundancy or temporal redundancy.

DISCLOSURE OF THE INVENTION

Technical Problem

Accordingly, the present invention is directed to a method and apparatus for decoding/encoding a video signal that can substantially enhance efficiency in coding the video signal.

Technical Solution

An object of the present invention is to enhance coding efficiency of video sequence using inter-block or inter-view correlation effectively.

Another object of the present invention is to efficiently compensate for illumination difference between views in multi-view sequence.

Another object of the present invention is to efficiently transmit inter-view reference information indicating inter-view dependency.

Another object of the present invention is to enhance coding efficiency of a video signal using depth information.

Another object of the present invention is to enhance coding efficiency of a video signal or provide a user with various services using camera information.

A further object of the present invention is to provide a decoding method and apparatus, by which video sequence data can be efficiently decoded.

ADVANTAGEOUS EFFECTS

According to the present invention, signal processing efficiency can be enhanced by predicting motion information using temporal and spatial correlations of a video sequence. More precise prediction is enabled by predicting coding information of a current block using coding information of a picture having high correlation with the current block, whereby a transmitted error is reduced to perform efficient coding. Even if motion information of a current block is not transmitted, it is able to calculate motion information very similar to that of the current block. Hence, a restoration rate is enhanced. It is able to improve coding efficiency and a sequence reconstruction rate using depth information. It is able to enhance coding efficiency using camera information. And, it is also able to provide various services to a user.

In the present invention, an offset value of a current block is predicted using information of a neighbor block and a corresponding difference value is transmitted. Hence, it is able to minimize information that should be transmitted for illumination compensation (hereinafter abbreviated IC). In case of predictive coding using at least two reference blocks, more efficient coding is enabled by applying offset value and flag information by at least one of various methods. When the offset value of the current block is predicted, more accurate prediction can be performed by checking whether a reference index of the current block is identical to that of the neighbor block. It is able to minimize information, which should be transmitted, in a manner of predicting flag information indicating whether to perform illumination compensation of a current block and then transmitting a corresponding difference value only. Likewise, more accurate prediction can be performed by checking whether a reference index of the current block is identical to that of a neighbor block.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 7 to 14 are diagrams of syntaxes for describing various application examples that use camera information according to an embodiment of the present invention;

FIGS. 16 to 20 are diagrams of various syntaxes for describing inter-view reference information according to an embodiment of the present invention.

BEST MODE

Figure 1:
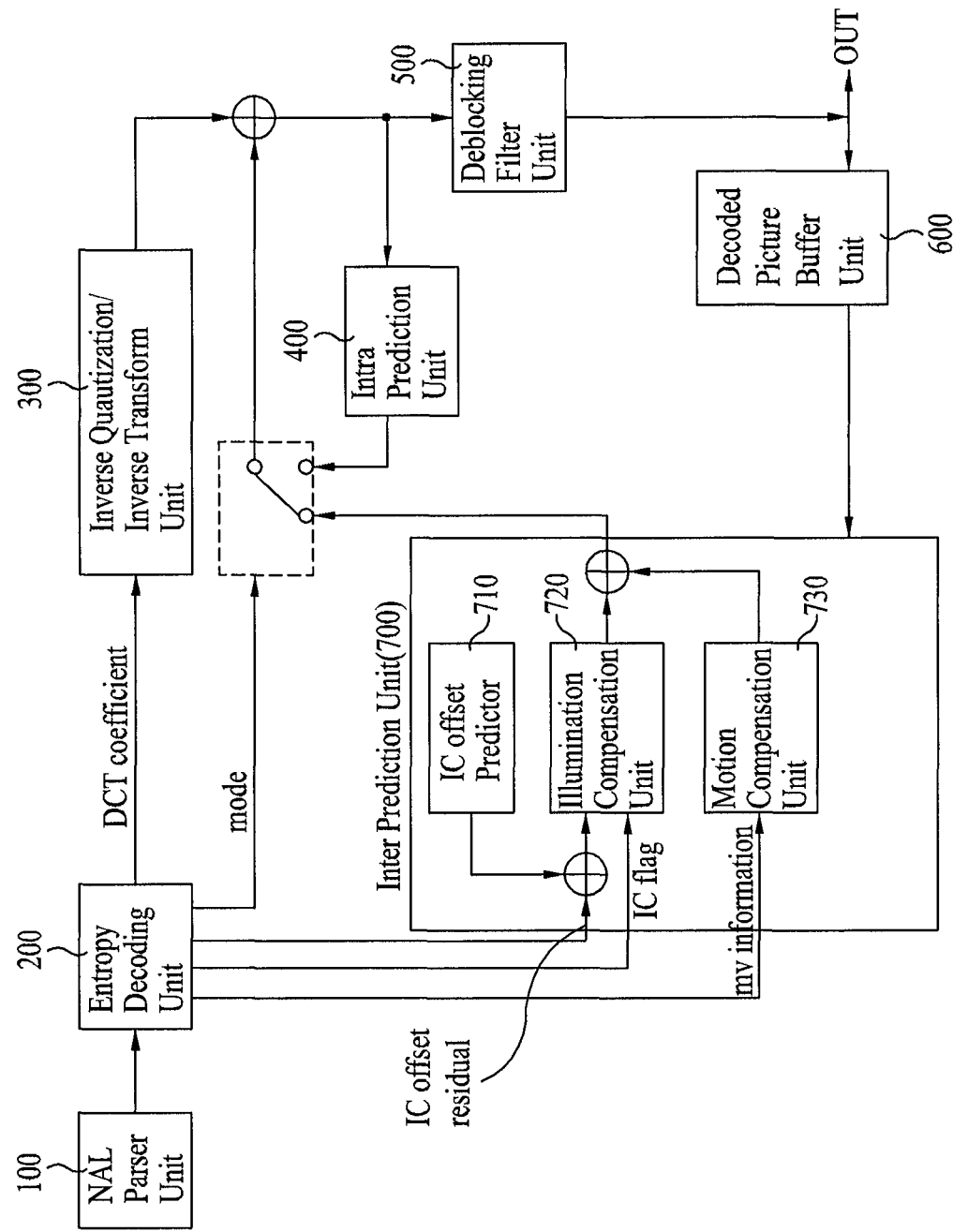
FIG. 1 is a schematic block diagram of a video signal decoding apparatus according to an embodiment of the present invention.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of decoding a video signal includes obtaining IC difference information of a neighbor block of a current block, when information associated with illumination compensation for the current block is not available in a bitstream, deriving IC difference information of the current block using the IC difference information of the neighbor block, deriving an IC flag indicating whether illumination compensation is performed on the current block, based on the IC difference information of the current block, and performing the illumination compensation on the current block, based on the IC difference information of the current block and the IC flag.

Preferably, when the IC difference information of the current block is 0, the IC flag of the current block is derived into 0.

Preferably, when the IC difference information of the current block is not 0, the IC flag of the current block is derived into 1.

Preferably, the IC difference information of the current block is derived based on whether a reference index of the current block is identical to that of the neighbor block.

More preferably, when there exists one neighbor block having the reference index identical to that of the current block, the IC difference information of the current block is set to the IC difference information of the neighbor block.

In this case, the neighbor block is checked in order of upper, left, upper-right and upper-left blocks of the current block.

More preferably, when there exist three neighbor blocks, each having the reference index identical to that of the current block, the IC difference information of the current block is set to a median value of IC difference informations of the three neighbor blocks.

Preferably, the video signal is received as a broadcast signal.

Preferably, the video signal is received via digital medium.

To further achieve these and other advantages and in accordance with the purpose of the present invention, a computer-readable medium includes a program for executing the present invention. And, the program is recorded in the computer-readable medium.

To further achieve these and other advantages and in accordance with the purpose of the present invention, an apparatus for decoding a video signal includes an IC difference prediction unit deriving IC difference information of a current block using an obtained IC difference information of a neighbor block, when information associated with illumination compensation for the current block is not available in a bitstream; and an IC unit deriving an IC flag indicating whether illumination compensation is performed on the current block based on the IC difference information of the current block, and performing the illumination compensation on the current block based on the IC difference information of the current block and the IC flag.

It is to be understood that both the foregoing general description and the following detailed description are exemplary and explanatory and are intended to provide further explanation of the invention as claimed.

MODE FOR INVENTION

Reference will now be made in detail to the preferred embodiments of the present invention, examples of which are illustrated in the accompanying drawings.

First of all, compression coding of video signal data considers spatial redundancy, spatial redundancy, scalable redundancy, and inter-view redundancy. And, compression coding is enabled by considering inter-view existing mutual redundancy in the course of the compression coding. Compression coding scheme, which takes inter-view redundancy into consideration, is just an embodiment of the present invention. And, the technical idea of the present invention is applicable to temporal redundancy, scalable redundancy, and the like. In this disclosure, coding can include both concepts of encoding and decoding. And, coding can be flexibly interpreted to correspond to the technical idea and scope of the present invention.

Looking into a bit sequence configuration of a video signal, there exists a separate layer structure called a NAL (network abstraction layer) between a VCL (video coding layer) dealing with a moving picture encoding process itself and a lower system that transmits and stores encoded information. An output from an encoding process is VCL data and is mapped by NAL unit prior to transmit or storage. Each NAL unit includes compressed video data or RBSP (raw byte sequence payload: result data of moving picture compression) that is the data corresponding to header information.

The NAL unit basically includes two parts, a NAL header and an RBSP. The NAL header includes flag information (nal_ref_idc) indicating whether a slice as a reference picture of the NAL unit is included and an identifier (nal_unit_type) indicating a type of the NAL unit. Compressed original data is stored in the RBSP. And, RBSP trailing bit is added to a last portion of the RBSP to represent a length of the RESP as an 8-bit multiplication. As the types of the NAL unit, there are IDR (instantaneous decoding refresh) picture, SPS (sequence parameter set), PPS (picture parameter set), SEI (supplemental enhancement information), and the like.

In the standardization, requirements for various profiles and levels are set to enable implementation of target product with an appropriate cost. In this case, a decoder should meet the requirements determined according to the corresponding profile and level. Thus, two concepts, 'profile' and 'level' are defined to indicate a function or parameter for representing how far the decoder can cope with a range of a compressed sequence. And, a profile identifier (profile_idc) can identify that a bit stream is based on a prescribed profile. The profile identifier means a flag indicating a profile on which a bit stream is based. For instance, in H.264/AVC, if a profile identifier is 66, it means that a bit stream is based on a baseline profile. If a profile identifier is 77, it means that a bit stream is based on a main profile. If a profile identifier is 88, it means that a bit stream is based on an extended profile. Moreover, the profile identifier can be included in a sequence parameter set.

So, in order to handle a multi-view sequence, it needs to be identified whether an inputted bit stream is a multi-view profile. If the inputted bit stream is the multi-view profile, it is necessary to add syntax to enable at least one additional information for multi-view to be transmitted. In this case, the multi-view profile indicates a profile mode for handling multi-view video as an additional technique of H.264/AVC. In MVC, it may be more efficient to add syntax as additional information for an MVC mode rather than unconditional syntax. For instance, when a profile identifier of AVC indicates a multi-view profile, if information for a multi-view sequence is added, it is able to enhance encoding efficiency.

Sequence parameter set indicates header information containing information crossing over encoding of an overall sequence such as a profile, a level, and the like. A whole compressed moving picture, i.e., a sequence should start from a sequence header. So, a sequence parameter set corresponding to header information should arrive at a decoder before the data referring to the parameter set arrives. Namely, the sequence parameter set RBSP plays a role as the header information for the result data of the moving picture compression. Once a bit stream is inputted, a profile identifier preferentially identifies that the inputted bit stream is based on which one of a plurality of profiles. So, by adding a part for determining whether an inputted bit stream relates to a multi-view profile (e.g., 'If (profile_idc==MULTI_VIEW_PROFILE)') to syntax, it is determined whether the inputted bit stream relates to the multi-view profile. Various kinds of configuration information can be added only if the inputted bit stream is approved as relating to the multi-view profile. For instance, it is able to add a total number of views, a number of inter-view reference pictures, a view identification number of an inter-view reference picture, and the like. And, a decoded picture buffer can use various kinds of informations on an interview reference picture to construct and manage a reference picture list.

FIG. 1 is a schematic block diagram of an apparatus for decoding a video signal according to the present invention.

Referring to FIG. 1, the decoding apparatus includes a parsing unit 100, an entropy decoding unit 200, an inverse quantization/inverse transform unit 300, an intra prediction unit 400, a deblocking filter unit 500, a decoded picture buffer unit 600, an inter prediction unit 700, and the like. And, the inter prediction unit 700 can include an IC difference prediction unit 710, an IC (illumination compensation) unit 720, a motion compensation unit 730, and the like.

The parsing unit 100 carries out parsing by NAL unit to decode a received video sequence. In general, at least one sequence parameter set and at least one picture parameter set are transferred to a decoder before a slice header and slice data are decoded. In this case, various kinds of configuration informations can be included in a NAL header area or an extension area of a NAL header. Since MVC is an additional scheme for a conventional AVC scheme, it may be more efficient to add various configuration informations in case of an MVC bit stream only rather than unconditional addition. For instance, it is able to add flag information for identifying a presence or non-presence of an MVC bit stream in the NAL header area or the extension area of the NAL header. Only if an inputted bit stream is a multi-view sequence coded bit stream according to the flag information, it is able to add configuration informations for a multi-view sequence. For instance, the configuration informations can include view identification information, inter-view picture group identification information, inter-view prediction flag information, temporal level information, priority identification information, identification information indicating whether it is an instantaneous decoded picture for a view, and the like. They will be explained in detail with reference to FIG. 2.

The entropy decoding unit 200 carries out entropy decoding on a parsed bit stream and a coefficient of each macroblock, a motion vector, and the like are then extracted. The inverse quantization/inverse transform unit 300 obtains a coefficient value transformed by multiplying a received quantized value by a predetermined constant and then transforms the coefficient value inversely to reconstruct a pixel value. Using the reconstructed pixel value, the intra prediction unit 400 performs intra-screen prediction from a decoded sample within a current picture. Meanwhile, the deblocking filter unit 500 is applied to each coded macroblock to reduce block distortion. A filter smoothens a block edge to enhance an image quality of a decoded frame. Selection of a filtering process depends on boundary strength and gradient of an image sample around a boundary. Pictures through filtering are outputted or stored in the decoded picture buffer unit 600 to be used as reference pictures.

The decoded picture buffer unit 600 plays a role in storing or opening the previously coded pictures to perform inter-picture prediction. In this case, to store the pictures in the decoded picture buffer unit 600 or to open the pictures, 'frame_num' of each picture and POC (picture order count) are used. So, in MVC, since there exist pictures in a view different from that of a current picture exists among the previously coded pictures, in order to use these pictures as reference pictures, view information for identifying a picture is usable together with the 'frame_num' and the POC.

The decoded picture buffer unit 600 can use information on view in constructing the reference picture list for the inter-view prediction. For instance, inter-view reference information can be used. Inter-view reference information means information used to indicate an inter-view dependent relation. For instance, there can be a total number of views, a view identification number, a number of inter-view reference pictures, a view identification number of an inter-view reference picture, and the like.

The decoded picture buffer unit 600 manages reference pictures to realize inter-picture prediction more flexibly. For instance, a memory management control operation method and a sliding window method are usable. This is to manage a reference picture memory and a non-reference picture memory by unifying the memories into one memory and realize efficient memory management with a small memory. In multi-view video coding, since pictures in a view direction have the same picture order count, information for identifying a view of each of the pictures is usable in marking them. And, reference pictures managed in the above manner can be used by the inter prediction unit 700.

Inter-coded macroblock can be divided into macroblock partitions. And, each of the macroblock partitions can be predicted from one or two reference pictures. The inter prediction unit 700 includes the IC difference prediction unit 710, the IC unit 720, the motion compensation unit 730, and the like.

In case that an inputted bitstream corresponds to a multi-view sequence, since the respective view sequences are captured by different cameras, respectively, an illumination difference is generated due to internal and external factors of the cameras. To prevent this, the IC unit 720 performs illumination compensation (IC). In performing illumination compensation, it is able to use flag information indicating whether to perform illumination compensation on a prescribed layer of a video signal. For instance, it is able to perform illumination compensation using flag information indicating whether to perform illumination compensation on a corresponding slice or macroblock. In performing illumination compensation using the flag information, it is applicable to various kinds of macroblock types (e.g., inter 16×16 mode, B-skip mode, direct mode, etc.).

In performing illumination compensation, it is able to use information of a neighbor block, information of a block in a view different from that of a current block or IC difference information of the current block to reconstruct the current block. In case that a current block refers to neighbor blocks in different view, it is able to perform illumination compensation using information on a reference picture list for inter-view prediction which is stored in the decoded picture buffer unit 600. In this case, the OC difference value of the current block may mean a difference between an average pixel value of the current block and an average pixel value of a corresponding reference block. For example of using the IC difference information, an IC difference predictive value of the current block is obtained using neighbor blocks of the current block and it is able to use an IC difference residual (IC offset residual) that is a difference value between the IC difference information and the IC difference predictive value. Hence, a decoder is able to reconstruct the IC difference information of the current block using the IC difference residual and the IC difference predictive value.

In obtaining an IC difference predictive value of a current block, it is able to use information of a neighbor block. For instance, it is able to predict IC difference information of a current block using IC difference information of a neighbor block. Prior to this, it is checked whether a reference index of the current block is identical to that of the neighbor block. According to a result of the check, it is able to determine whether to use a prescribed block or a prescribed value.

It is able to predict coding information of a current block using coding information correlation of a view direction. For instance, coding information can include illumination compensation information, predictive direction information, partition information or the like. In particular, in order to predict illumination compensation information of a current block, it is able to use illumination compensation of blocks neighboring to the current block. And, it is also able to use illumination compensation information of a block of a picture which corresponds to the current block and exists in the same view of the current block.

The motion compensation unit 730 compensates for a motion of a current block using informations transmitted from the entropy decoding unit 200. Motion vectors of blocks neighbor to the current block are extracted from a video signal and a motion vector of the current block are then obtained. And, the motion of the current block is compensated using the obtained motion vector predicted value and a differential vector extracted from the video signal. And, it is able to perform the motion compensation using one reference picture or a plurality of pictures. In multi-view video coding, in case that a current picture refers to pictures in different views, it is able to perform motion compensation using information for the inter-view prediction reference picture list stored in the decoded picture buffer unit 600. And, it is also able to perform motion compensation using view information for identifying a view of the corresponding picture.

Direct prediction mode is an encoding mode for predicting motion information of a current block from motion information of an encoded block. Since this method is able to save a count of bits required for decoding the motion information, compression efficiency is enhanced. For instance, a temporal direct mode predicts motion information of a current block using motion information correlation in a temporal direction. The temporal direct mode is effective when a speed of the motion in a sequence containing different motions is constant. In case that the temporal direct mode is used for multi-view video coding, inter-view motion vector should be taken into consideration.

For another example of the direct prediction mode, a spatial direct mode predicts motion information of a current block using motion information correlation in a spatial direction. The spatial direct mode is effective when a speed of motion varies in a sequence containing the same motions. Within a reference picture having a smallest reference number in a reverse direction reference picture list (List 1) of a current picture, it is able to predict motion information of the current picture using motion information of a block co-located with the current block. Yet, in multi-view video coding, the reference picture may exist in a view different from that of the current picture. In this case, various embodiments are usable in applying the spatial direct mode.

In video signal coding, it is able to use depth information for a specific application or other purposes. The depth information may mean the information capable of indicating inter-view disparity difference. For instance, it is able to obtain a disparity vector through inter-view prediction. And, the obtained disparity vector should be transmitted to a decoding device for disparity compensation of a current block. Yet, in case that a depth map is found and then transmitted to a decoding device, it is able to derive the disparity vector from the depth map (or disparity map) without transmitting the disparity vector to the decoding device. Depth map can be transmitted together with a motion vector or a disparity vector. In this case, the depth map may mean depth information for each predetermined unit. For instance, the predetermined unit may correspond to a pixel unit or a block unit. If so, it is advantageous that the number of bits of the depth information, which should be transmitted to the decoding device, can be lowered. It is able to reconstruct a virtual view between two views neighboring to each other using the depth map. By deriving a disparity vector from the depth map, it is able to provide a new disparity compensation method. Thus, in case of using a picture in a different view in the process for deriving a disparity vector from the depth map, view information for identifying a view of picture can be used. This will be explained in detail with reference to FIG. 6 later.

The inter-predicted pictures and the intra-predicted pictures by the above-explained processes are selected according to a prediction mode to reconstruct a current picture.

Figure 2:
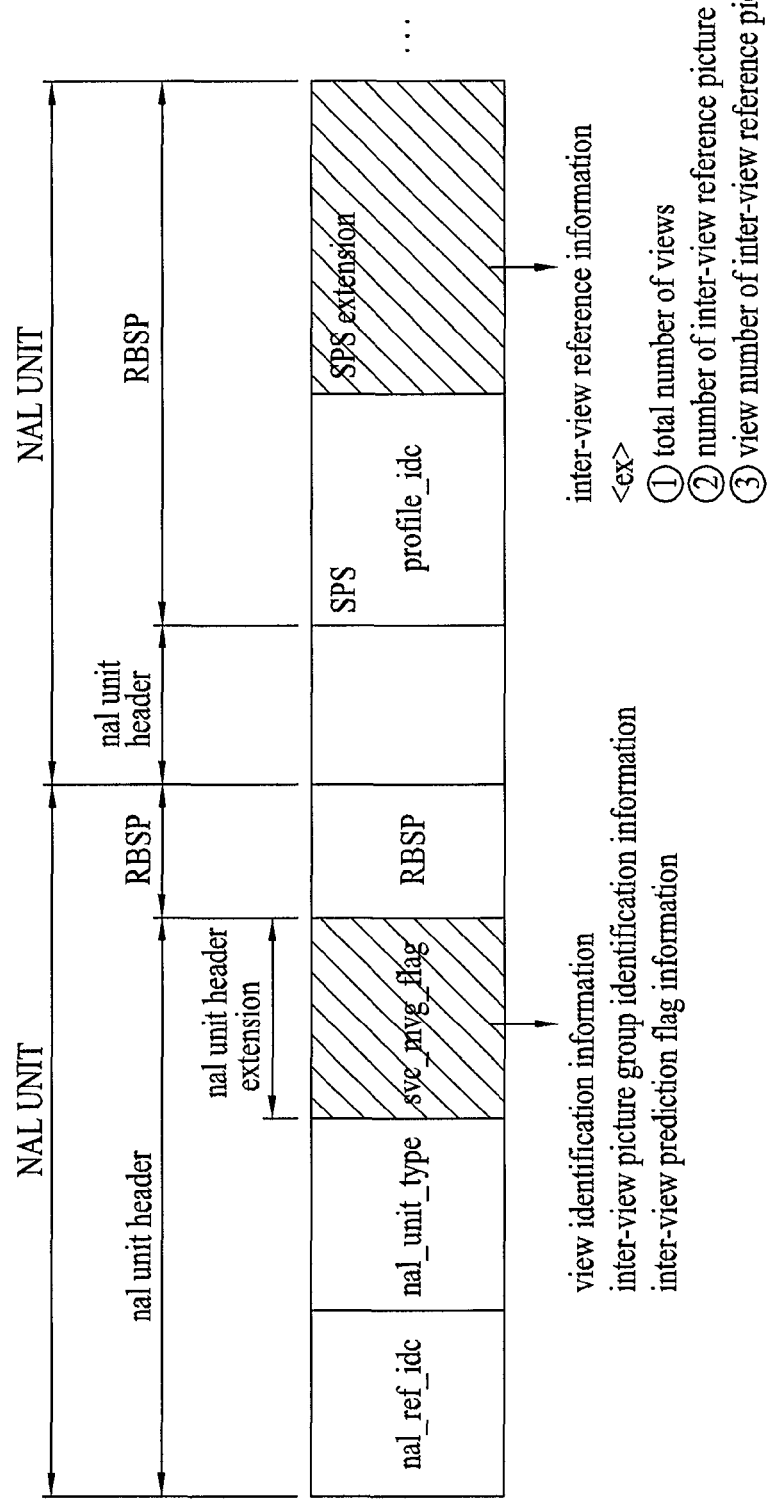
FIG. 2 is a diagram of configuration informations on a multi-view sequence that can be added to a multi-view sequence coded bit stream according to an embodiment of the present invention.

FIG. 2 is a diagram of configuration informations on a multi-view sequence addable to a multi-view sequence coded bit stream according to one embodiment of the present invention.

FIG. 2 shows an example of a NAL-unit configuration to which configuration informations on a multi-view sequence can be added. NAL unit can mainly include NAL unit header and RBSP (raw byte sequence payload: result data of moving picture compression). And, the NAL unit header can include identification information (nal_ref_idc) indicating whether the NAL unit includes a slice of a reference picture and information (nal_unit_type) indicating a type of the NAL unit. And, an extension area of the NAL unit header can be limitedly included. For instance, if the information indicating the type of the NAL unit is associated with scalable video coding or indicates a prefix NAL unit, the NAL unit is able to include an extension area of the NAL unit header. In particular, if the nal_unit_type=20 or 14, the NAL unit is able to include the extension area of the NAL unit header. And, configuration informations for a multi-view sequence can be added to the extension area of the NAL unit header according to flag information (svc_mvc_flag) capable of identifying whether it is MVC bit stream.

For another instance, if the information indicating the type of the NAL unit is information indicating a sequence parameter set, the RBSP can include information on the sequence parameter set. In particular, if nal_unit_type=7, the RBSP can include information for a sequence parameter set. In this case, the sequence parameter set can include an extension area of the sequence parameter set according to profile information. For example, if profile information (profile_idc) is a profile relevant to multi-view video coding, the sequence parameter set can include an extension area of the sequence parameter set. Alternatively, a subset sequence parameter set can include an extension area of a sequence parameter set according to profile information. The extension area of the sequence parameter set can include inter-view reference information indicating inter-view dependency.

Various configuration informations on a multi-view sequence, e.g., configuration informations that can be included in an extension area of NAL unit header or configuration informations that can be included in an extension area of a sequence parameter set are explained in detail as follows.

First of all, view identification information means information for discriminating a picture in a current view from a picture in a different view. In coding a video sequence signal, POC (picture order count) and 'frame_num' are used to identify each picture. In case of a multi-view video sequence, inter-view prediction is carried out. So, identification information to discriminate a picture in a present view from a picture in another view is needed. Thus, it is necessary to define view identification information for identifying a view of a picture. The view identification information can be obtained from a header area of a video signal. For instance, the header area can be a NAL header area, an extension area of a NAL header, or a slice header area. Information on a picture in a view different from that of a current picture is obtained using the view identification information and it is able to decode the video signal using the information on the picture in the different view.

The view identification information is applicable to an overall encoding/decoding process of the video signal. For instance, view identification information can be used to indicate inter-view dependency. Number information of inter-view reference pictures, view identification information of an inter-view reference picture and the like may be needed to indicate the inter-view dependency. Like the number information of the inter-view reference pictures or the view identification information of the inter-view reference picture, information used to indicate the inter-view dependency shall be named inter-view reference information. In this case, the view identification information can be used to indicate the view identification information of the inter-view reference picture. The inter-view reference picture may mean a reference picture used in performing inter-view prediction on a current picture. And, the view identification information can be intactly applied to multi-view video coding using 'frame_num' that considers a view instead of considering a specific view identifier.

Inter-view picture group identification information means information capable of identifying whether a coded picture of a current NAL unit is an inter-view picture group. In this case, the inter-view picture group means a coded picture that only refers to a slice that all slices exist in a frame on a same time zone. For instance, it means a coded picture that refers to a slice in a different view only but does not refer to a slice in a current view. In decoding a multi-view sequence, an inter-view random access may be possible. For inter-view prediction, inter-view reference information is necessary. In obtaining the inter-view reference information, inter-view picture group identification information is usable. For instance, if a current picture corresponds to an inter-view picture group, inter-view reference information on the inter-view picture group can be obtained. If a current picture corresponds to a non-inter-view picture group, inter-view reference information on the non-inter-view picture group can be obtained.

Thus, in case that inter-view reference information is obtained based on inter-view picture group identification information, it is able to perform inter-view random access more efficiently. This is because inter-view reference relation between pictures in an inter-view picture group can differ from that in a non-inter-view picture group. And, in case of an inter-view picture group, pictures in a plurality of views can be referred to. For instance, a picture of a virtual view is generated from pictures in a plurality of views and it is then able to predict a current picture using the picture of the virtual view.

In constructing a reference picture list, the inter-view picture group identification information can be used. In this case, the reference picture list can include a reference picture list for inter-view prediction. And, the reference picture list for the inter-view prediction can be added to the reference picture list. For instance, in case of initializing a reference picture list or modifying the reference picture list, the inter-view picture group identification information can be used. And, it can be also used to manage the added reference pictures for the inter-view prediction. For instance, by dividing the reference pictures into an inter-view picture group and a non-inter-view picture group, it is able to make a mark indicating that reference pictures failing to be used in performing inter-view prediction shall not be used. And, the inter-view picture group identification information is applicable to a hypothetical reference decoder.

Inter-view prediction flag information means information indicating whether a coded picture of a current NAL unit is used for inter-view prediction. The inter-view prediction flag information is usable for a part where temporal prediction or inter-view prediction is performed. In this case, identification information indicating whether NAL unit includes a slice of a reference picture can be used together. For instance, although a current NAL unit fails to include a slice of a reference picture according to the identification information, if it is used for inter-view prediction, the current NAL unit can be a reference picture used for inter-view prediction only. According to the identification information, if a current NAL unit includes a slice of a reference picture and used for inter-view prediction, the current NAL unit can be used for temporal prediction and inter-view prediction. If NAL unit fails to include a slice of a reference picture according to the identification information, it can be stored in a decoded picture buffer. This is because, in case that a coded picture of a current NAL unit is used for inter-view prediction according to the inter-view prediction flag information, it needs to be stored.

Aside from a case of using both of the flag information and the identification information together, one identification information can indicate whether a coded picture of a current NAL unit is used for temporal prediction or/and inter-view prediction.

Temporal level information means information on a hierarchical structure to provide temporal scalability from a video signal. Though the temporal level information, it is able to provide a user with a sequence on various time zones.

Priority identification information means information capable of identifying a priority of NAL unit. It is able to provide view scalability using the priority identification information. For example, it is able to define view level information using the priority identification information. In this case, view level information means information on a hierarchical structure for providing view scalability from a video signal. In a multi-view video sequence, it is necessary to define a level for a time and a level for a view to provide a user with various temporal and view sequences. In case of defining the above level information, it is able to use temporal scalability and view scalability. Hence, a user is able to view a sequence at a specific time and view only or a sequence according to another condition for restriction only. The level information can be set differently in various ways according to its referential condition. For instance, the level information can be set different according to camera location or camera alignment. And, the level information can be determined by considering view dependency. For instance, a level for a view having an inter-view picture group of I picture is set to 0, a level for a view having an inter-view picture group of P picture is set to 1, and a level for a view having an inter-view picture group of B picture is set to 2. Thus, the level value can be assigned to the priority identification information. Moreover, the level information can be randomly set without being based on a special reference.

In the following description, various embodiments for providing an efficient decoding method of a video signal are explained.

Figure 3:
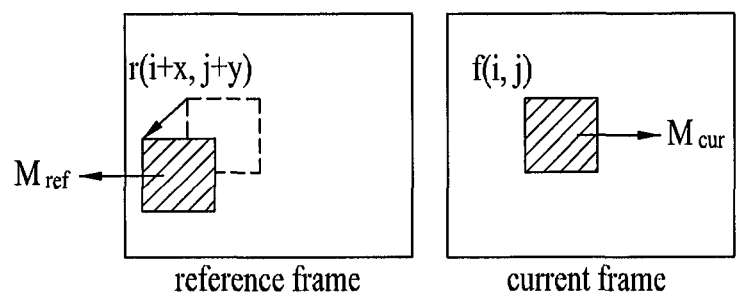
FIG. 3 is a diagram to explain a process for obtaining IC difference information of a current block according to one embodiment of the present invention.

FIG. 3 is a diagram to explain a process for obtaining IC difference information of a current block according to one embodiment of the present invention.

In comparing similarity between a current block and a candidate reference block, an illumination difference between the two blocks should be taken into consideration. To compensate for the illumination difference (illumination change), new motion estimation and motion compensation are carried out. New SAD can be found using Formula 1.

$$M_{curr} = \frac{1}{S \times T} \sum_{i=m}^{m+S-1} \sum_{j=n}^{m+T-1} f(i, j)$$ [Formula 1]

$$M_{ref}(p, q) = \frac{1}{S \times T} \sum_{i=p}^{p+S-1} \sum_{j=q}^{q+T-1} r(i, j)$$

$$NewSAD(x, y) = \sum_{i=m}^{m+S-1} \sum_{j=n}^{m+T-1} |\{f(i, j) - M_{curr}\} -$$ [Formula 2]

$$\{r(i + x, j + y) - M_{ref}(m + x, n + y)\}|$$

In this case, $M_{curr}$ indicates an average pixel value of a current block, $M_{ref}$ indicates an average pixel value of a reference block, $f(i,j)$ indicates a pixel value of a current block, and $r(i+x, j+y)$ indicates a pixel value of a reference block. By performing motion estimation based on new SAD shown in Formula 2, it is able to obtain an average pixel value difference between the current block and the reference block. And, the obtained average pixel value difference is named IC difference information (IC_offset).

In case of performing motion estimation having illumination compensation applied thereto, IC difference information and a motion vector are obtained. And, the illumination compensation is carried out by Formula 3 using the IC difference information and the motion vector.

$$NewR(i, j) = \{f(i, j) - M_{curr}\} - \{r(i + x', j + y') -$$ [Formula 3]

$$M_{ref}(m + x', n + y')\}$$

$$= \{f(i, j) - r(i + x', j + y')\} - M_{curr} -$$

$$M_{ref}(m + x', n + y')\}$$

$$= \{f(i, j) - r(i + x', j + y')\} - IC\_offset$$

In Formula 3, NewR(i,j) indicates a residual value resulting from execution of illumination compensation and (x',y') indicates a motion vector.

IC difference information ($M_{curr}-M_{ref}$) should be transmitted to a decoding unit. And, the illumination compensation in the decoding unit is carried out as follows.

$$f'(i, j) = \{NewR''(x', y', i, j) + r(i + x', j + y')\} +$$ [Formula 4]

$$\{M_{curr} - M_{ref}(m + x', n + y')\}$$

$$= \{NewR''(x', y', i, j) + r(i + x', j + y')\} +$$

$$IC\_offset$$

In Formula 4, NewR"(i,j) indicates a reconstructed and illumination-compensated residual value and f'(I,j) indicates a pixel value of a reconstructed current block.

In order to reconstruct a current block, IC difference information has to be transmitted to a decoding unit. And, the IC difference information can be predicted from information of neighbor blocks. To further reduce the number of bits to code the IC difference information, it is able to send an IC difference residual (illumination compensated residual signal) (RIC_offset) only. This can be represented as Formula 5.

RIC_offset=IC_offset−predIC_offset [Formula 5]

Figure 4:
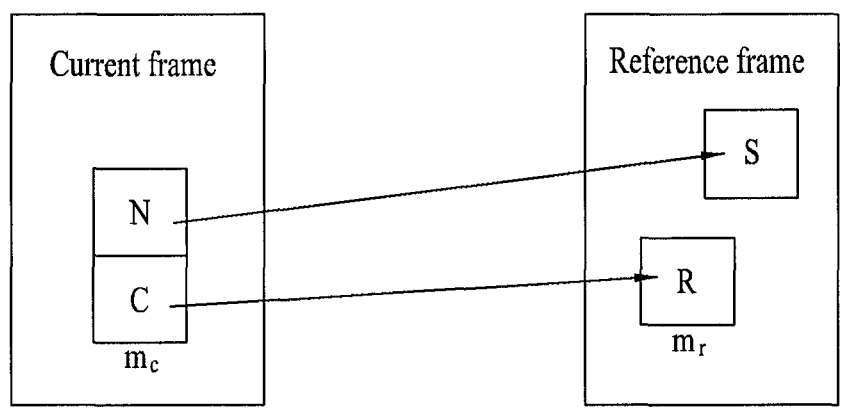
FIG. 4 and FIG. 5 are diagrams to explain a motion vector predicting method by considering illumination compensation according to an embodiment of the present invention.
Figure 5:
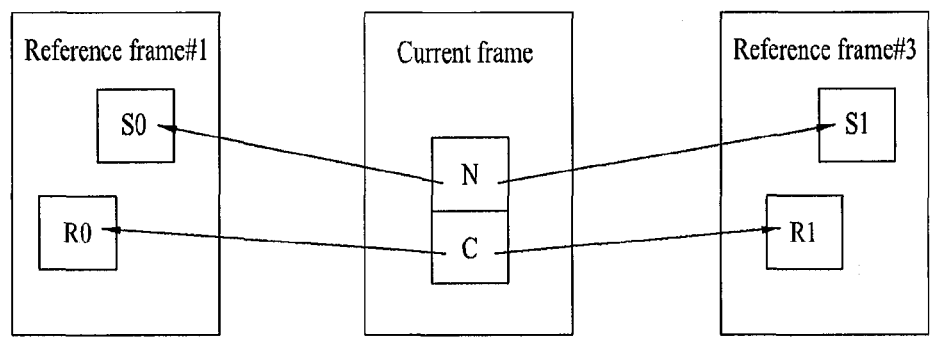

FIG. 4 and FIG. 5 are diagrams to explain a motion vector predicting method by considering illumination compensation according to an embodiment of the present invention.

A process for performing illumination compensation using flag information indicating whether to perform illumination compensation of a current block and IC difference information of the current block according to an embodiment of the present invention is explained as follows.

First of all, to perform illumination compensation, a decoding unit extracts flag information and IC difference information of neighbor blocks of a current block, reference indexes of corresponding reference blocks of the current and neighbor blocks and the like from a video signal, and is then able to obtain an IC difference predictive value of the current block using the informations. And, an IC difference residual indicating a difference value between IC difference information of the current block and the IC difference predictive value is obtained. The IC difference information of the current block can be reconstructed using the IC difference residual value and the IC difference predictive value. In this case, in reconstructing the IC difference information of the current block, it is able to use an IC flag (IC_flag) indicating whether to perform illumination compensation on the current block.

In the first place, an IC flag indicating whether to perform illumination compensation on a current block can be obtained from a video signal. When the illumination compensation is performed according to the flag information, it is able to reconstruct IC difference information of the current block indicating a difference between an average pixel value of the current block and an average pixel value of a reference block. Like this, the illumination compensation technique codes a difference value of average pixel values of blocks belonging to different pictures. In case that a flag indicating whether to apply the illumination compensation technique is used for each block, when a corresponding block belongs to a P slice, a single flag information and a single IC difference information are just encoded/decoded. Yet, when a corresponding block belongs to a B slice, several methods are available.

In FIG. 4, 'C' indicates a current block (C), 'N' indicates a block neighboring to the current block C, 'R' indicates a block referred to by the current block C, and 'S' indicates a block referred to by the block N neighboring to the current block C. Moreover, '$m_c$' indicates an average pixel value of a current block and 'm$_r$' indicates an average pixel value of a block referred to by the current block. Assuming that IC difference information of the current block C is set to 'IC_offset', it results in 'IC_offset=m$_c$−m$_r$'. Likewise, assuming that IC difference information of the neighbor block N is set to 'IC_offset_pred', an encoding unit is just able to send an IC difference residual (RIC_offset) indicating a difference value between the IC difference information (IC_offset) of the current block and the IC difference information (IC_offset_pred) of the neighbor block instead of transmitting the value intact to reconstruct the IC difference information 'IC_offset' of the current block C. In this case, the IC difference residual (RIC_offset) can be represented as Formula 5. In generating an IC difference predictive value of the current block from flag information or IC difference information of neighbor block, various methods are applicable. For instance, it is able to use information of a single neighbor block or information of at least two neighbor blocks. In case of using the information of the at least two neighbor blocks, it is able to use an average or a median. Thus, if a current block is coded using a single reference block only, it is able to perform illumination compensation using a single IC difference information and a single flag information.

Yet, in case that the corresponding block belongs to the B slice, i.e., if a current block is coded using at least two reference blocks, various methods are available. For instance, in FIG. 5, assume that 'C' indicates a current block C, 'N' indicates a block neighboring to the current block C, 'R0' indicates a reference block in a reference picture 1 of List 0 referred to by the current block, and 'S0' indicates a reference block in reference picture list 1 of List 0 referred to by the neighbor block. Assume that 'R1' indicates a reference block in reference picture 3 of List 1 referred to by the current block and 'S0' indicates a reference block in reference picture 3 of List 1 referred to by the neighbor block. In this case, since flag information and IC difference information of the current block exists for each reference block, there exist two values each. Hence, in using the flag information and the IC difference information, it is able to use at least one of them each.

A process for performing illumination compensation for a current block according to an embodiment of the present invention is explained as follows.

In case that an IC flag of a current block is 0, illumination compensation for the current block is not performed. In case that the IC flag is 1, a process for reconstructing IC difference information of the current block is performed. In this case, in obtaining a predictive value of the current block, information of neighbor block is available.

For instance, it is able to predict IC difference information of the current block using the IC difference information of the neighbor block. Prior to this, it is checked whether a reference index of the current block is identical to that of the neighbor block. According to a result of the check, it is able to determine which neighbor block will be used or which value will be used. It is checked whether flag information of the neighbor block is true or false. According to the check result, it is able to determine whether to use the neighbor block.

According to another embodiment of the present invention, a process for performing illumination compensation based on a macroblock type is explained as follows. A process for deriving an IC flag and IC difference information may differ according to the macroblock type.

For instance, in case that a macroblock type is P_Skip, it is able to preferentially check whether neighbor blocks are available and whether illumination compensation is performed. If all of the neighbor blocks are available and if the illumination compensation is performed, an IC flag and IC difference information of a current block can be derived in the following manner. First of all, if an average of IC difference informations of the neighbor blocks is not 0, the IC flag of the current block is set to 1 and the IC difference information of the current block can be set to the average value of the IC difference informations of the neighbor blocks. For instance, the neighbor blocks can be right and left blocks of the current block. Otherwise, if the average of the IC difference informations of the neighbor blocks is 0, each of the IC flag of the current block and the IC difference information of the current block can be set to 0.

In case that a prescribed one of neighbor blocks is available and illumination compensation is performed, an IC flag of a current block is set to 1 and IC difference information of the current block can be set to IC difference information of the neighbor block. For instance, the neighbor block can be a left or upper block of the current block. Alternatively, the neighbor block can be an upper right block or an upper left block. In this case, in checking the prescribed one of the neighbor blocks, a left block can be checked after an upper block has been checked.

In other cases, an IC flag and IC difference information of a current block can be set to 0 each. For example, the three kinds of cases including a case of using two blocks, upper and left blocks of a current block, a case of using an upper block of a current block only and a case of using a left block of current block are excluded for the cases.

Meanwhile, in case that a macroblock type is B_Skip, IC difference information of a current block can be derived in a following manner. First of all, it is able to determine whether a reference index of a current block is identical to that of a neighbor block. Based on the determination result, it is able to obtain a predicted value for illumination compensation of the current block. Using the obtained predicted value, it is able to reconstruct IC difference information of the current block. The step of determining whether the reference indexes of the current and neighbor blocks are identical to each other and the step of obtaining the predicted value based on the determination result are explained in detail as follows.

For example, it is able to determine whether a neighbor block having the reference index identical to that of a current block exists or not. In this case, it is assumed that a neighbor block to be used is a block encoded using illumination compensation. As a result of the determination, when there exists a single neighbor block having the reference index identical to that of the current block, it is able to assign IC difference information of the neighbor block having the identical reference index to an IC difference predictive value of the current block. For instance, when an upper block of a current block is a block that is encoded using illumination compensation and when the upper block has the reference index identical to that of the current block, it is able to set IC difference information of the upper block to an IC difference predictive value of the current block. Otherwise, the same process can be carried out on an upper left block of the current block. Otherwise, the same process can be carried out on an upper right block of the current block. Otherwise, if three neighbor blocks at upper, left and upper right sides of the current block are blocks using illumination compensation, it is able to set an IC difference predictive value of the current block to a median value between IC difference informations of the three neighbor blocks. Otherwise, it is able to set an IC difference predictive value of the current block to 0.

If there exist two neighbor blocks having the reference index identical to that of a current block, it is able to set an IC difference predictive value of the current block to an average value between IC difference informations of the two neighbor blocks.

The IC difference predictive value deriving methods is identically applicable to a process for predicting an IC flag.

Meanwhile, in case that a macroblock type is B_Skip, an IC flag of a current block can be derived in the following manner. The IC flag of the current block can be derived based on IC difference information of the current block.

For instance, when IC difference information of a current block is 0, an IC flag, of the current block can be set to 0. Otherwise, an IC flag of the current block can be set to 1. In this case, the IC difference information of the current block can be the value identical to an IC difference predictive value that is set according to one of the various embodiments for deriving the IC difference predictive value.

Meanwhile, when a macroblock type is B_Direct_16×16, IC difference information of a current block can be derived as follows. For instance, when a type of a current block is B_Direct_16×16 and an IC flag of the current block is set to 1, IC difference information of the current block can be derived according to a sum of a transmitted IC difference residual value and a derived IC difference predictive value. In this case, the derived IC difference predictive value can be derived according to the above-explained various embodiments.

A method of performing illumination compensation using flag information indicating a presence or non-presence of an execution of the illumination compensation of a corresponding block according to another embodiment of the present invention is explained as follows.

When reconstructing IC difference information of a current block, it is able to use the aforesaid IC flag (IC_flag) indicating a presence or non-presence of an execution of the illumination compensation of a corresponding block. Alternatively, it is able to obtain the IC difference predictive value using both of the above-mentioned method of checking a reference index and the above-mentioned method of predicting an IC flag.

First of all, it is able to determine whether there exists a neighbor block having the reference index identical to that of a current block. Based on the determination result, it is able to obtain an IC difference predictive value for illumination compensation of the current block. In this case, the IC difference predictive value can be obtained based on whether an IC flag of a neighbor block is 1. And, it is able so able to predict an IC flag of the current block based on the result. Hence, it is able to perform the illumination compensation by reconstructing IC difference information of the current block using the obtained IC difference predictive value and the predicted IC flag.

A method of predicting an IC flag of a current block based on whether a reference index of the current bock is identical to a reference index of a neighbor block according to another embodiment of the present invention is explained as follows.

First of all, it is able to determine whether there exists a neighbor block having the reference index identical to that of a current block. As the determination result, when there exits a single neighbor block having the reference index identical to that of the current bock, it is able to predict an IC flag of the current block from an IC flag of the neighbor block having the same reference index. According to the determination result, when there exist two neighbor blocks having the reference index identical to that of the current block, it is able to predict an IC flag of the current block from one of IC flags of the two neighbor blocks having the same reference index. According to the determination result, when there exist three neighbor blocks having the reference index identical to that of the current block, it is able to predict an IC flag of the current block from a median value of IC flags of the three neighbor blocks having the same reference index. when there does not exit a neighbor block having the reference index identical to that of the current bock, the IC flag prediction of the current block is not performed.

According to another embodiment of the present invention, context-modeling different from the case of 16×16 inter-mode, can be performed to macroblock types, to which illumination compensation is applied. For flag information, three contexts can be considered according to flag values of neighbor blocks (e.g., left and upper blocks of current block). A case of a flag value 'true' is converted to 1 and a case of flag value 'false' converted to 0. If two values for the respective cases are summed, it results in three kinds of cases. So, flag information is encoded/decoded using these three contexts. For example, it is able to use two context models for IC residual, like transform coefficient levels coding. In particular, binarization is executed by UEGO (unary/0th order Exp-Golomb), a single context model is applied to a first bin value, and a single model context is applied to the rest bin values of a unary prefix part. Sign bit can be encoded/decoded in bypass mode. As another embodiment of flag information, three contexts can be considered according to a value of predicted flag information. Using this, it is able to perform encoding/decoding.

The above description in this disclosure is applicable to macroblock unit. And, the above description in this disclosure is also applicable to smaller blocks.

Figure 6:
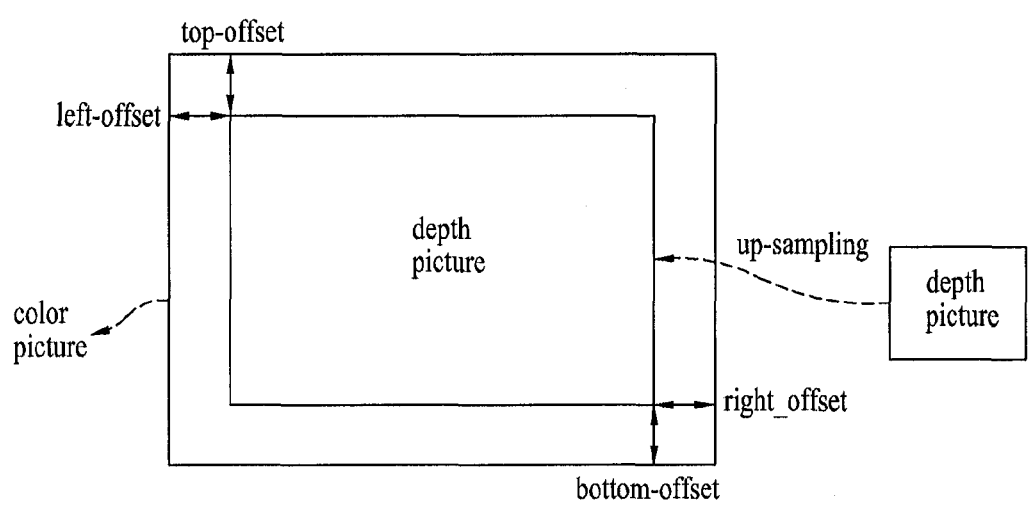
FIG. 6 is a diagram to explain a coding method using a depth map according to an embodiment of the present invention.

FIG. 6 is a diagram to explain a coding method using a depth map according to an embodiment of the present invention.

In video signal coding, it is able to use depth information for a specific application or a different purpose. The depth information may mean the information capable of indicating an inter-view disparity difference. For instance, it is able to obtain a disparity vector through inter-view prediction. And, the obtained disparity vector should be transmitted to a decoding device for disparity compensation of a current block. Yet, if the depth map is transmitted to a decoding device, it is able to derive the disparity vector from the depth map (or a disparity map) without transmitting the disparity vector to the decoding device. And, it is also able to transmit a motion vector or a disparity vector together with the depth map. In this case, the depth map may mean that depth information is indicated for each predetermined unit. For instance, the predetermined unit may correspond to a pixel unit or a block unit.

According to an embodiment of the present invention, a case of coding a depth map together with color components is explained as follows.

First of all, information indicating whether a depth map is currently used for a vide sequence. For instance, it is able to obtain depth_coding_flag from an extension area of a sequence parameter set. If the depth_coding_flag is 0, it is able to code color components, e.g., YUV components only. If the depth_coding_flag is 1, a depth map is coded together with the color components and then used.

According to another embodiment of the present invention, various schemes are applicable in using a depth map. For instance, various kinds of depth maps are usable according to spatial resolution. In particular, if depth_map_mode is 0, it may mean that a depth map is not used. If depth_map_mode is 1, it may mean that a depth map of full resolution is used. If depth_map_mode is 2, it may mean that a depth map ½ downsampled in horizontal direction is used. If depth_map_mode is 3, it may mean that a depth map ½ downsampled in vertical direction is used. Theses values are just embodiments and other values can be set up. Moreover, depth maps of various spatial resolutions are usable as well as ½ downsampling.

Meanwhile, in case that an inputted depth map has a full resolution, if depth_map_mode indicates a depth map of a different resolution, a downsampling process should be performed by an encoder and an upsampling process should be performed by a decoder. So, if an inputted depth map, as shown in FIG. 5, is already downsampled with a low resolution, a decoder may perform an upsampling process with a full resolution. Moreover, it is able to reconstruct a current picture using offset values indicating position difference between a color picture and an upsampled depth picture. The offset may include a left offset, a right offset, a top offset, and a bottom offset.

The depth_coding_flag and the depth_mode_map can be obtained from a sequence parameter set, an extension area of a sub-sequence parameter set, a picture parameter set, a slice header or a macroblock layer.

FIGS. 7 to 14 are diagrams of syntaxes for describing various application examples that use camera information according to an embodiment of the present invention.

First of all, camera information is the information about a camera that generates a sequence corresponding to a series of pictures. A series of pictures captured by a single camera construct a single view. Even if a position of a camera is changed, it is able to construct a new view. Meanwhile, as a type of camera information, there can be a camera parameter. The camera parameters can be classified into an intrinsic camera parameter and an extrinsic camera parameter. The intrinsic camera parameters can include focal length, aspect ratio, skew, principal point and the like. And, the extrinsic camera parameters can include position information of a camera in world coordinate system, rotation matrix, translation vector and the like. And, it is able to precisely find geometrical relations between cameras using informations included in the extrinsic camera parameters.

And, it is able to utilize topological relations between cameras. For instance, if camera arrangement makes 1-dimensional or horizontal/vertical 2-dimensional configuration, it is able to observe the topological relation using information on the camera arrangement. Hence, a intuitively specified view can be selected and then displayed. In doing so, the information on the camera arrangement can be transmitted as side information.

For instance, the information on the camera arrangement can correspond to a linear or arc configuration according to a presence or non-presence of linearity or a 1- or 2-dimensional configuration according to a dimension. In case that the camera arrangement corresponds to a 2-dimensional arrangement, there can exist the same number of views per row according to a presence or non-presence of normality or the different number of views per row. Thus, as various references are applied, a transmitted syntax structure may vary. For this, detailed embodiments are explained as follows.

First of all, it is able to define a flag indicating a prescribed configuration of camera arrangement. For instance, if linear_configuration_flag is 1, it may mean that camera arrangement is linear. If linear_configuration_flag is 0, it may mean that camera arrangement is arc. Besides, the flag can include various types and can be changed according to definitions.

Assuming that camera arrangement corresponds to a 2-dimensional configuration, it is able to define a flag indicating whether a camera actually exists at each node. For instance, if camera_present_flag[i][j] is 1, it may mean that a camera exists at a node in $i^{th}$ row and $j^{th}$ column. If camera_present_flag[i][j] is 0, it may mean that a camera does not exist at a node in the $i^{th}$ row and $j^{th}$ column.

Assuming that camera arrangement corresponds to a 2-dimensional configuration, it is able to define information indicating the numbers of maximum views in horizontal and vertical directions, respectively. For instance, max_num_view_hor_minus1 may mean the maximum view number 1 in horizontal direction. And, max_num_view_ver_minus1 may mean the maximum view number −1 in vertical direction. Moreover, num_view_hor_minus1[i] may mean the maximum view number −1 in horizontal direction of a $j^{th}$ column.

And, view_id[i][j] may mean a view identification number at a node in $i^{th}$ row and $j^{th}$ column.

It is able to define information indicating a prescribed dimension of camera arrangement. For instance, if one_dimension_flag is 1, it may mean that cameras are arranged in horizontal direction only. If one_dimension_flag is 0, it may mean that cameras are 2-dimensaionally arranged in vertical and horizontal directions. Besides, the flag can include various dimensions and may vary according to how to be defined. For instance, if regular_two_dimension_flag is 1, it may mean that the number of views on each row is identical in horizontal or vertical direction. If regular_two_dimension_flag is 0, it may mean that the number of views on each row is not identical in horizontal or vertical direction.

The above-described informations can generate various application examples by being combined into various shaped. Several embodiments are explained in the following description.

In the embodiment shown in FIG. 7, shown is a syntax structure indicating whether a camera is present at each node in 2-dimensional camera arrangement. First of all, it is able to check whether cameras are arranged in linear or arc configuration according to information of linear_configuration_flag. And, it is able to obtain the number of maximum views in horizontal/vertical direction. According to camera_present_flag[i][j], it is able to check whether camera is present at each node. If the camera is present, it is able to know a view identification number at a position whether the camera is present.

FIG. 8 shows a syntax structure facilitating camera arrangement to be checked in case of 1-dimensional configuration. Unlike FIG. 7, FIG. 8 shows the 1-dimensional configuration, it is not necessary to check a presence or non-presence of camera at each node. Hence, it is able to know camera arrangement by checking a view identification number directly. Below the else syntax, it is able to confirm 2-dimensional camera arrangement like FIG. 6.

FIG. 9 shows a syntax structure enabling camera arrangement to be checked appropriately in accordance with a flag indicating a type of dimensional arrangement. First of all, in case that a 2-dimensional configuration is indicated according to one_dimension_flag, it is able to check each view identification number by obtaining the number of views on each column in vertical direction. Meanwhile, in case that a 1-dimensional configuration is indicated, it is able to check each view identification number by obtaining the number of maximum views in horizontal direction.

FIG. 10 shows an embodiment resulting from combining the embodiments of FIG. 7 and FIG. 9 together. In this embodiment, it is able to check a presence or non-presence of camera according to one_dimension_flag indicating a prescribed dimensional arrangement.

In an embodiment shown in FIG. 11, a view identification number is directly checked using the maximum view number in horizontal direction in case of a 1-dimensional arrangement. In case of a 2-dimensional arrangement, a view identification number is checked using the maximum view number in vertical direction additionally.

In an embodiment shown in FIG. 12, it is able to check camera arrangement using information indicating whether the number of views on each column in horizontal or vertical direction is identical. First of all, if the number of views on each column in horizontal or vertical direction is not identical, it is able to check camera arrangement by checking the view number in horizontal direction on each column in vertical direction. On the other hand, in case that the number of views on each column in horizontal or vertical direction is identical, it is able to check each view identification information according to the number of maximum views in horizontal/vertical direction.

FIG. 13 shows an embodiment resulting from combining the embodiments of FIG. 12 and FIG. 7 together. First of all, if the number of views on each column in horizontal or vertical direction is not identical, it is able to check a presence or non-presence of camera according to the number of maximum views in horizontal/vertical direction. On the other hand, if the number of views on each column in horizontal or vertical direction is identical, it is able to check each view identification number according to the number of maximum views in horizontal/vertical direction.

FIG. 14 shows an embodiment resulting from combining the embodiments of FIG. 12 and FIG. 9 together. First of all, only in case of a 2-dimensional arrangement according to a flag indicating prescribed dimension(s) of arrangement, it is able to obtain information indicating whether the number of views on each column in horizontal or vertical direction is identical. And, it is also able to obtain information indicating the number of maximum views in vertical direction. Otherwise, each of the two informations can be set to 0. The rest of the syntax is explained in the former description of the embodiment shown in FIG. 12.

Figure 15:
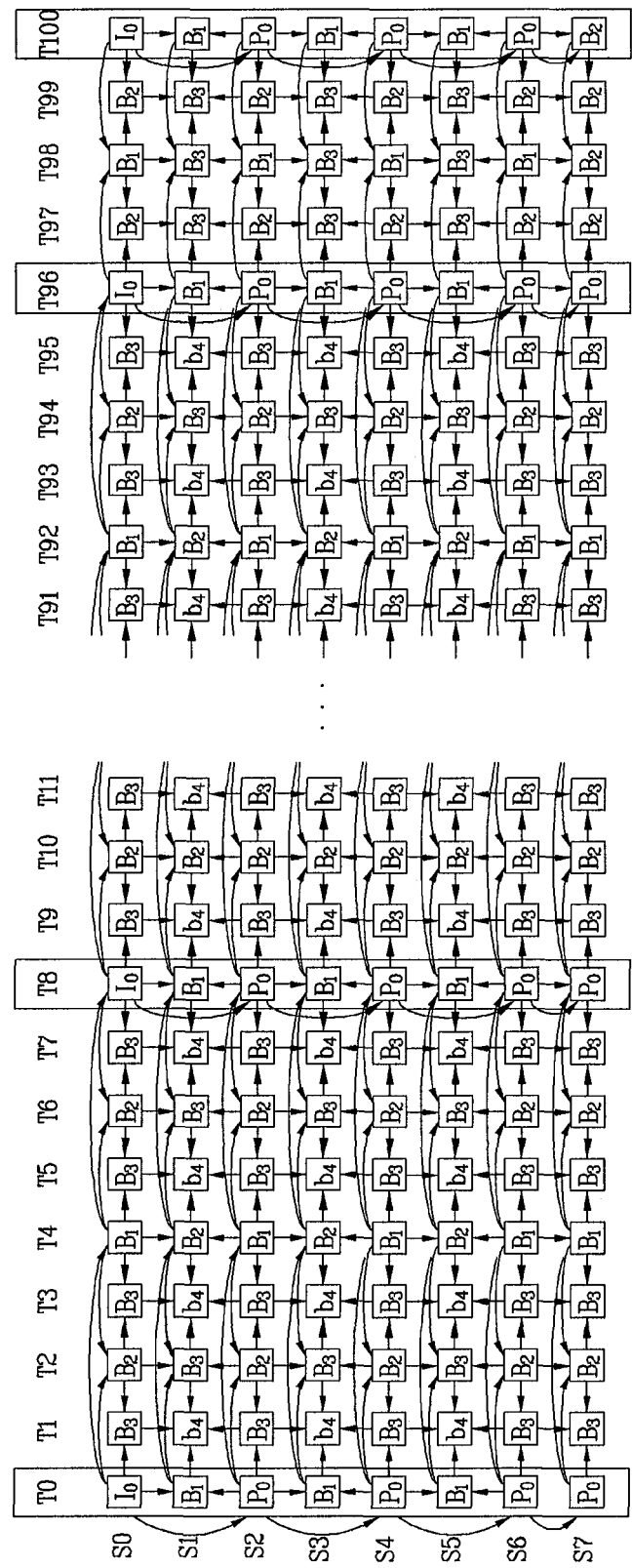
FIG. 15 is a diagram of an overall prediction structure of a multi-view sequence signal according to an embodiment of the present invention to explain a concept of an inter-view picture group.

FIG. 15 is a diagram of an overall prediction structure of a multi-view sequence signal according to an embodiment of the present invention to explain a concept of an inter-view picture group.

Referring to FIG. 15, T0 to T100 on a horizontal axis indicate frames according to time and S0 to S7 on a vertical axis indicate frames according to view. For instance, pictures at T0 mean sequences captured by different cameras on the same time zone T0, while pictures at S0 mean sequences captured by a single camera on different time zones. And, arrows in the drawing indicate predicted directions and orders of the respective pictures. For instance, a picture P0 in a view S2 on a time zone T0 is a picture predicted from I0, which becomes a reference picture of a picture P0 in a view S4 on the time zone T0. And, it becomes a reference picture of pictures B1 and B2 on time zones T4 and T2 in the view S2, respectively.

For a multi-view sequence decoding process, an inter-view random access may be required. So, an access to a random view should be possible by minimizing the decoding process. In this case, a concept of an inter-view picture group may be needed to perform an efficient random access. The definition of the inter-view picture group was mentioned in FIG. 2. For instance, in FIG. 3, if a picture I0 in a view S0 on a time zone T0 corresponds to an inter-view picture group, all pictures in different views on the same time zone, i.e., the time zone T0 can correspond to the inter-view picture group. For another instance, if a picture I0 in a view S0 on a time zone T8 corresponds to an inter-view picture group, all pictures in different views on the same time zone, i.e., the time zone T8 can correspond to the inter-view picture group. Likewise, all pictures in T16, ..., T96, and T100 become an example of the inter-view picture group as well. According to another embodiment, in an overall prediction structure of MVC, GOP can start from a I picture. And, the I picture is compatible with H.264/AVC. So, all inter-view picture groups compatible with H.264/AVC can become the I picture. Yet, in case of replacing the pictures-I by P picture, more efficient coding is possible. In particular, more efficient coding is enabled using a prediction structure that GOP is made to start from P picture compatible with H.264/AVC.

In this case, if the inter-view picture group is re-defined, it becomes a coded picture capable of referring to a slice on a different time zone in a same view as well as a slice that all slices exist in a frame on a same time zone. Yet, the case of referring to a slice on a different time zone in a same view may be limited to an inter-view picture group compatible with H.264/AVC only.

After the inter-view picture group has been decoded, all of the sequentially coded pictures are decoded from the picture decoded ahead of the inter-view picture group in an output order without inter-prediction.

Considering the overall coding structure of the multi-view video sequence shown in FIG. 15, since inter-view dependency of an inter-view picture group differs from that of a non-inter-view picture group, it is necessary to discriminate the inter-view picture group and the non-inter-view picture group from each other according to the inter-view picture group identification information.

The inter-view reference information means information indicating what kind of structure is used to predict inter-view sequences. This can be obtained from a data area of a video signal. For instance, it can be obtained from a sequence parameter set area. And, the inter-view reference information can be obtained using the number of reference pictures and view information of the reference pictures. For instance, after a total number of views has been obtained, it is able to obtain view identification information for identifying each view based on the total number of the views. And, number information of inter-view reference pictures, which indicates a number of reference pictures for a reference direction of each view, can be obtained. According to the number information of the inter-view reference pictures, it is able to obtain view identification information of each inter-view reference picture.

Through this method, the inter-view reference information can be obtained. And, the inter-view reference information can be obtained in a manner of being categorized into a case of an inter-view picture group and a case of a non-inter-view picture group. This can be known using inter-view picture group identification information indicating whether a coded slice in a current NAL corresponds to an inter-view picture group. The inter-view picture group identification information can be obtained from an extension area of NAL header or a slice layer area.

The inter-view reference information obtained according to the inter-view picture group identification information is usable for construction, management and the like of a reference picture list.

In the following description, various methods for indicating inter-view reference information are explained.

FIGS. 16 to 20 are diagrams of various syntaxes for describing inter-view reference information according to an embodiment of the present invention.

As mentioned in the foregoing description of FIG. 16, inter-view reference information can be independently understood by being classified into a case of an inter-view picture group and a case of a non-inter-view picture group.

FIG. 16 shows a syntax structure capable eliminating data that is redundant in obtaining inter-view reference information.

Referring to FIG. 16, it is able to obtain view identification information of each inter-view reference picture according to the total view number. In this case, a view having view_id[0] may correspond to a base view or an independent view. If so, in the number information of inter-view reference picture, the number in a L0 direction becomes 0 that is equal to that in a L1 direction. This is applicable to the case of the inter-view or non-inter-view picture group in the same manner. For instance, in case of the inter-view picture group, 'num_anchor_refs_l0[0]=num_anchor_refs_l1[0]=0' can be established [S1620, S1630]. In case of the non-inter-view picture group, 'num_non_anchor_refs_l0[0]=num_non_anchor_refs_l1[0]=0' can be established [S1650, S1660]. Hence, if i=0, the redundant data may not be transmitted [S1610, S1640]. And, the number information of inter-view reference pictures in L0/L1 direction in case of 'i=0' can be set to 0 each. This is applicable to the case of the inter-view or non-inter-view picture group in the same manner.

According to another embodiment of the present invention, it is able to define view identification information to have a different meaning. For instance, view identification information may mean a view identification number assigned to each view according to a coding order. Alternatively, the view identification information (view_id[i]) may mean a view identification number assigned to each view according to a random order. Alternatively, the view identification information (view_id[i]) may mean a view identification number assigned to each view according to camera arrangement information.

FIG. 17 shows a syntax indicating inter-view reference information using similarity between a prediction structure of an inter-view picture group and a prediction structure of a non-inter-view picture group according to an embodiment of the present invention.

The prediction structure of the non-inter-view picture group may have the structure dependent on the prediction structure of the inter-view picture group. So, the inter-view reference relation of the inter-view picture group can be indicated using the inter-view reference relation of the non-inter-view picture group.

Referring to FIG. 17, it is able to obtain inter-view reference information of a non-inter-view picture group pS1710]. For instance, it is able to obtain num_non_anchor_refs_l0[i], non_anchor_refs_l0[i][j], num_non_anchor_refs_l1[i], and non_anchor_refs_l1[i][j].

And, the following 'for' statement indicates an inter-view reference relation of the inter-view picture group. In this case, it is able to use the obtained inter-view reference information on the non-inter-view picture group. First of all, by setting a value of non_anchor_refs_l0[i][j] for anchor_refs_l0[i][j], it is able to know a reference relation of the non-inter-view reference group [S1720]. By obtaining anchor_refs_l0[i][j] as many as a number difference between inter-view reference pictures and non-inter-view reference pictures, it is able to understand the rest predictive structure of the inter-view picture group [S1730]. This is applicable to the L1 direction in the same manner [S1740, S1750].

If so, the following relation shown in Formula 6 can be established.

num_anchor_refs_l0[i]≧num_non_anchor_refs_l0[i]

num_anchor_refs_l1[i]≧num_non_anchor_refs_l1[i]  [Formula 6]

When the inter-view reference relation is represented, the prediction structure of the inter-view picture group can representatively indicate a prediction structure of an overall sequence. If information necessary for the prediction relation between non-inter-view picture groups is derived from inter-view picture groups, more efficient coding is enabled. For instance, in case of motion skip mode, it is able to use a prediction structure of inter-view picture group when a current block in a non-inter-view picture group uses motion information of a picture in a neighbor view. In particular, it is able to use motion information obtained from a corresponding picture in a prediction structure of inter-view picture group.

FIG. 18 shows a syntax indicating inter-view reference information using similarity between a prediction structure of an inter-view picture group and a prediction structure of a non-inter-view picture group according to an embodiment of the present invention.

The syntax structure shown in FIG. 18 is similar to that shown in FIG. 17. Yet, in FIG. 18, it is able to obtain information (num_diff_anchor_non_anchor_refs_l0[i], num_diff_anchor_non_anchor_refs_l1[i]) indicating a difference between the number of inter-view reference pictures and the number of non-inter-view reference pictures [S1810, S1830]. By obtaining anchor_refs_l0[i][j] using the information indicating the difference between the number of inter-view reference pictures and the number of non-inter-view reference pictures, it is able to understand the rest prediction structure of the inter-view picture group [S1820, S1840]. In this case, the rest prediction structure may mean a prediction structure of inter-view picture group only different from a structure of non-inter-view picture group.

FIG. 19 shows a syntax structure to indicate inter-view reference relation in a simpler manner according to an embodiment of the present invention.

If a prediction structure of non-inter-view picture group becomes a subset of a prediction structure of inter-view picture group, it may be more effective. This is because inter-view prediction in view direction is possible in inter-view picture group only but temporal prediction in time direction is impossible. Hence, it is referable that inter-view prediction is maximally utilized in aspect of eliminating redundancy of inter-view sequence. On the other hand, in non-inter-view picture group, both view-directional prediction and time-directional prediction are possible. Yet, coding gain through the time-directional prediction may be greater than that through the view-directional prediction. Hence, it may be a more effective structure that the inter-view prediction relation in the non-inter-view picture group belongs to the inter-view prediction structure in the inter-view picture group.

Thus, the prediction structure of the non-inter-view picture group may have the structure dependent on the prediction structure of the inter-view picture group. So, the inter-view reference relation of the inter-view picture group can be represented using the inter-view reference relation of the non-inter-view picture group. This may be efficient in aspects of random access and view scalability as well. For instance, in case of a picture that belongs not to a prediction structure of non-inter-view picture group but to a prediction structure of inter-view picture group, it may be efficient because the picture needs not to be decoded.

Meanwhile, there may be a case that there exists no inter-view prediction relation in inter-view or non-inter-view picture group. Thus, the absence of the inter-view prediction relation in the inter-view picture group may be more effective to fast random access and parallel processing. And, it may be introduced to the non-inter-view picture group to reduce complexity.

Hence, according to an embodiment of the present invention, it is able to represent inter-view reference relation in a single format 'multiview_ref_lx' instead of representing the inter-view reference relation by discriminating anchor_ref_lX and non_anchor_ref_lX [S1920. S1940].

For instance, in case that inter-view prediction relation in inter-view picture group is absent, in order to include a case of num_anchor_refs_l0[i]=num_anchor_refs_l1[i]=0, Formula 7 is usable [S1910, S1930].

$$\max(\text{num\_anchor\_refs\_}lx[i], \text{num\_non\_anchor\_refs\_}lx[i])$$ [Formula 7]

In this case, an inter-view reference in $i^{th}$ view can be represented as a single syntax (multiview_ref_lx[i]). Moreover, 'from 0 to min(num_anchor_refs_lx[i], num_non_anchor_refs_lx[i]−1)' is able to represent a reference relation common to inter-view picture group and non-inter-view picture group.

FIG. 20 shows a syntax structure capable of eliminating data that is redundant in obtaining inter-view reference information.

In FIG. 19, it is able to obtain view identification information of inter-view reference picture according to a value of max(num_anchor_refs_lx[i], num_non_anchor_refs_lx[i]). In this case, a view having view_id[0] may correspond to a base view or an independent view. If so, in the number information of inter-view reference pictures, the number in a L0 direction becomes 0 that is equal to that in a L1 direction. This is applicable to the case of the inter-view or non-inter-view picture group in the same manner. For instance, in case of the inter-view picture group, 'num_anchor_refs_l0[0]=num_anchor_refs_l1[0]=0' can be established. In case of the non-inter-view picture group, 'num_non_anchor_refs_l0[0]= num_non_anchor_refs_l1[0]=0' can be established. Hence, if i=0, the redundant data may not be transmitted [S2010]. And, the number information of inter-view reference pictures in L0/L1 direction in case of 'i=0' can be set to 0 each.

As mentioned in the foregoing description, the decoding/encoding device, to which the present invention is applied, is provided to a transmitter/receiver for multimedia broadcasting such as DMB (digital multimedia broadcast) to be used in decoding video and data signals and the like. And, the multimedia broadcast transmitter/receiver can include a mobile communication terminal.

A decoding/encoding method, to which the present invention is applied, is configured with a program for computer execution and then stored in a computer-readable recording medium. And, multimedia data having a data structure of the present invention can be stored in computer-readable recording medium. The computer-readable recording media include all kinds of storage devices for storing data that can be read by a computer system. The computer-readable recording media include ROM, RAM, CD-ROM, magnetic tapes, floppy discs, optical data storage devices, etc. and also includes a device implemented with carrier waves (e.g., transmission via internet). And, a bit stream generated by the encoding method is stored in a computer-readable recording medium or transmitted via wire/wireless communication network.

INDUSTRIAL APPLICABILITY

Accordingly, while the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of decoding a video signal with a decoding apparatus, comprising:
    obtaining, with the decoding apparatus, Illumination Compensation difference information of a neighbor block of a current block, when the video signal does not include an Illumination Compensation flag for the current block;
    deriving, with the decoding apparatus, an Illumination Compensation difference predictor of the current block using the Illumination Compensation difference information of the neighbor block;
    deriving, with the decoding apparatus, the Illumination Compensation flag based on the Illumination Compensation difference predictor of the current block, the Illumination Compensation flag indicating whether illumination compensation is performed on the current block; and
    performing, with the decoding apparatus, the illumination compensation on the current block, based on the Illumination Compensation difference predictor of the current block and the Illumination Compensation flag,
    wherein when the Illumination Compensation difference predictor of the current block is 0, the Illumination Compensation flag of the current block is derived as 0, and
    when the Illumination Compensation difference predictor of the current block is not 0, the Illumination Compensation flag of the current block is derived as 1.

2. The method of claim 1, wherein the Illumination Compensation difference predictor of the current block is derived based on whether a reference index of the current block is identical to that of the neighbor block.

3. The method of claim 2, wherein when there exists one neighbor block having the reference index identical to that of the current block, the Illumination Compensation difference predictor of the current block is set to the Illumination Compensation difference information of the neighbor block.

4. The method of claim 3, wherein the neighbor block is checked in order of upper, left, upper-right and upper-left blocks of the current block.

5. The method of claim 2, wherein when there exists three neighbor blocks, each having the reference index identical to that of the current block, the Illumination Compensation difference predictor of the current block is set to a median value of Illumination Compensation difference information of the three neighbor blocks.

6. The method of claim 1, wherein the video signal is received as a broadcast signal.

7. The method of claim 1, wherein the video signal is received via digital medium.

8. An apparatus for decoding a video signal, comprising:
    a decoding apparatus configured to derive an Illumination Compensation difference predictor of a current block using obtained Illumination Compensation difference information of a neighbor block, when information associated with illumination compensation for the current block is not available in a bitstream,
    the decoding apparatus configured to derive an Illumination Compensation flag based on the Illumination Compensation difference predictor of the current block, and configured to perform the illumination compensation on the current block based on the Illumination Compensation difference predictor of the current block and the Illumination Compensation flag, wherein when the Illumination Compensation difference predictor of the current block is 0, the Illumination Compensation flag of the current block is derived as 0, and when the Illumination Compensation difference predictor of the current block is not 0, the Illumination Compensation flag of the current block is derived as 1.

\* \* \* \* \*